(12) United States Patent
Su et al.

(10) Patent No.: US 8,388,490 B2
(45) Date of Patent: Mar. 5, 2013

(54) FIXED GEAR INTERNAL GEAR HUB

(75) Inventors: Hsin Yang Su, Taoyuan County (TW); Hung Chia Chen, Taoyuan County (TW)

(73) Assignee: Sun Race Sturmey Archer, Inc., Taoyuan County, Lu-Ju (TW)

( * ) Notice: Subject to any disclaimer, the term of this patent is extended or adjusted under 35 U.S.C. 154(b) by 517 days.

(21) Appl. No.: 12/647,005

(22) Filed: Dec. 24, 2009

(65) Prior Publication Data

US 2010/0160109 A1      Jun. 24, 2010

(30) Foreign Application Priority Data

Dec. 24, 2008 (TW) ................ 97150388 A

(51) Int. Cl.
*F16H 3/44* (2006.01)
(52) U.S. Cl. ........................................ 475/300
(58) Field of Classification Search .......... 475/296, 475/269, 300, 339, 344
See application file for complete search history.

(56) References Cited

U.S. PATENT DOCUMENTS

| | | | |
|---|---|---|---|
| 5,399,128 A * | 3/1995 | Nurnberger | 475/298 |
| 5,769,750 A * | 6/1998 | Rickels | 475/298 |
| 5,813,937 A | 9/1998 | Rickels | |
| 7,967,718 B2 * | 6/2011 | Hino | 475/330 |

FOREIGN PATENT DOCUMENTS

| | | |
|---|---|---|
| DE | 19927700 A1 | 6/1999 |
| GB | 417272 | 5/1934 |
| WO | 9420358 | 9/1994 |

OTHER PUBLICATIONS

Sturmey-Archer Gears Ltd.—Type "ASC" 3-Speed (Fixed) MK.1 Ratios -25%/-10%/D(1946).

* cited by examiner

*Primary Examiner* — David D Le
*Assistant Examiner* — David J Hlavka
(74) *Attorney, Agent, or Firm* — Barlow, Josephs & Holmes, Ltd.

(57) ABSTRACT

A fixed internal gear hub comprising a fixed axle, an input member and an output member each rotatably mounted about the axle, an epicyclic gear system comprising at least one sun gear, rotatably mounted about the axle, planet pinions disposed in a planet cage and a gear ring. The gear ring is connected non-rotatably to the input member. The planet cage is connected non-rotatably to the output member. A clutch enables the input member to be selectively non-rotatably connected to the planet cage and a selector key enables the sun gear to be selectively locked rotationally to the axle. The hub provides two fixed gear ratios and further fixed gear ratios may be provided by adding an additional sun gear or gears.

17 Claims, 5 Drawing Sheets

FIXED GEAR INTERNAL GEAR HUB

BACKGROUND AND SUMMARY OF THE INVENTION

The present invention relates to a fixed gear internal gear hub particularly, although not exclusively, for driving a pedal bicycle wheel.

A fixed gear bicycle (also known as a fixed wheel bicycle) is a pedal bicycle that has no free-wheel. The bicycle pedals are directly connected to the driving wheel of the bicycle and rotate whenever the driving wheel rotates. If the pedals are moved forwards the driving wheel of the bicycle will move forwards and if the pedals are moved backwards the driving wheel of the bicycle will move backwards.

Fixed gear bicycles are currently increasingly popular. Riding a fixed gear bicycle offers a different, and potentially more enjoyable, experience than riding a bicycle with a free-wheel. With a fixed gear bicycle riders may apply force to the pedals to slow and stop the bicycle.

Most fixed gear bicycles are single speed with the bicycle pedals driving a chain connected to a single sprocket fixed to the driving wheel of the bicycle.

To provide for greater flexibility in use, it is desirable to provide pedal bicycles with a transmission enabling the gear ratio between pedals and driving wheel to be changed.

It is known to provide a variable ratio transmission for a pedal bicycle by providing multiple sprockets and means for moving the bicycle chain between the sprockets, the derailleur gear system. However, this system only enables the chain to be moved between sprockets when rotating in one direction, so it is not suited to a fixed gear system.

Variable ratio transmissions are also provided on pedal bicycles by internally geared hub incorporating epicyclic gears. Some such systems, however, incorporate one or more one-way clutches or free-wheels to avoid conflicts between transmission paths. Such arrangements are therefore not suitable for application to fixed gear arrangements.

It is an object of embodiments of the present invention to provide a fixed gear internal gear hub capable of providing two or more transmission ratios, and in particular which improves over existing bicycle transmission arrangements.

According to the present invention there is provided a fixed gear internal gear hub comprising: a fixed axle, an input member and an output member, each rotatably mounted about the axle, an epicyclic gear system comprising at least one sun gear rotatably mounted about the axle, planet pinions disposed in a planet cage and a gear ring, the gear ring being connected non-rotatably to the input member and the planet cage being connected non-rotatably to the output member, a clutch for selectively non-rotatably connecting the input member to the planet cage and a selector key for selectively locking the sun gear rotatably relative to the axle.

Such an arrangement provides for two fixed gear ratios. With the clutch engaged and the selector key disengaged, so that the sun gear may rotate relative to the axle, a direct drive is obtained. With the selector key engaged, preventing the sun gear rotating relative to the axle, and the clutch disengaged a reduction gear is obtained between the input and output members.

The gear ring may be connected to the input member via the clutch. Alternatively the clutch may be connected to the input member via the gear ring.

The output member may be a hub shell rotatably mounted on the axle. The input member may be rotatably mounted between the hub shell and the axle. The hub shell may be mounted to the axle via a ball cup at one end and a ball ring at the opposite end.

The clutch may be axially moveable along the axle relative to the input member. The clutch may be connected to the input member by splines. The selector key may be axially moveable along the axle relative to the sun gear. The clutch and selector key may move together axially. The axle may include a slot and the selector key may be slidably mounted within the slot. A connecting rod may be connected to the selector key. The sun gear may include formations, such as splines, for engaging with the selector key to enable the selector key to lock the sub gear relative to the axle.

Two (or more) sun gears may be provided, together with appropriate compound planet pinions having areas of different diameter with differing numbers of geared teeth for meshing with the individual sun gears. With this arrangement, by selectively locking one of the sun gears a number of different reduction ratios may be provided.

The planet cage may include formations for engaging with the clutch, which may be a dog clutch. The input member may be connected to the gear ring by splines.

DESCRIPTION OF THE DRAWINGS

In order that the invention may be more clearly understood an embodiment thereof will now be described, by way of example, with reference to the accompanying drawings of which.

DESCRIPTION OF THE PREFERRED EMBODIMENT

Figure 1:
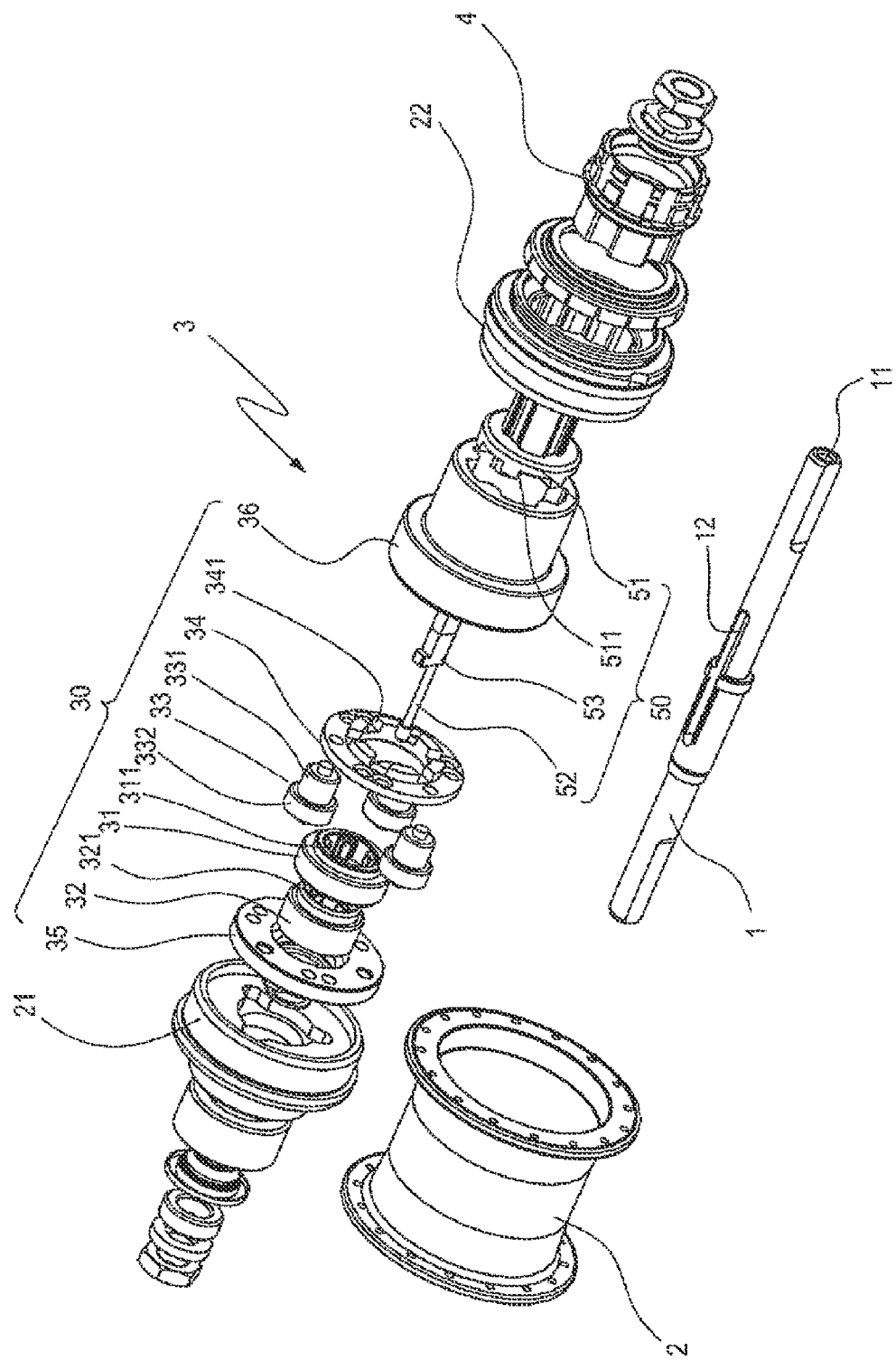
FIG. 1 is an exploded perspective view of a gear hub according to the invention.

Referring to the drawings, a gear hub comprises a fixed axle 1 on which is mounted a gear transmission, generally 3, which is disposed inside a hub shell 2 which may support a wheel of a bicycle. To one side of the hub shell 2 an input member 4 is rotatably mounted on the axle 1. A sprocket (not shown) may be mounted on the input member 4 to enable the hub gear to be driven by a bicycle chain. The input member 4 extends into the hub shell 2 and is connected to the gear transmission.

The hub shell 2 is supported on the axle 1 by way of a ball cup 21 and ball ring 22 positioned at opposite ends respectively of the hub shell. Ball cup 21 (shown to the left hand side of the hub gear in the drawings) is rotatably mounted on axle 1. Ball ring 22 is rotatably mounted to the input member 4, so the hub shell 2 is able to rotate relative to the axle 1 and input member 4.

The gear transmission 3 comprises an epicyclic gear system 30 and a gear change mechanism 50.

The epicyclic gear system 30 comprises first 31 and second 32 sun gears having different numbers of gear teeth and each rotatably mounted on the axle 1. The sun gears are arranged to mesh with compound planet pinions 33 disposed in a planet cage formed from right 34 and left 35 hand sides (as shown in the drawings). The planet pinions 33, in turn, mesh with a gear ring 36. The sun gears 31, 32 are rotatably mounted on the axle 1 and comprise internal splines 311. The planet pinions 33 have smaller 311 and larger 312 diameter parts for engaging with respective sun gears 31 and 32.

The first sun gear 31 has a greater number of gear teeth than the second sun gear 32. Correspondingly, the part 311 of the planet pinions 33 which meshes with the first sun gear 31 has fewer teeth than that which meshes with the second sun gear.

The left hand (as illustrated) part of the planet cage 35 is non-rotatably connected to ball cup 21 and, hence, to hub shell 2. These three components therefore all rotate together relative to the axle 1.

The gear change mechanism 50 comprises a dog clutch 51, rotatably and axially slidably mounted on the axle 1, a connecting rod 52 and selector key 53.

The outer face of the right hand part 34 of the planet cage comprises formations 341 which are configured to engage with corresponding formations 511 provided on the dog clutch 51. The dog clutch 51 is non-rotatably connected to the input member 4, by way of splines or any other suitable connection, so that the dog clutch 51 and input member 4 rotate together relative to the axle 1.

The gear ring 36 is also non-rotatably connected to the input member 4 and rotates with the driver 4 relative to the axle 1. The non-rotatable connection may be provided by splines, or any other suitable connection.

The axle 1 defines a blind bore 11, open to the end of the axle at which the input member 4 is disposed. A slot 12 is formed approximately midway along the axle 1 and extends into the bore 11. The connecting rod 52 is disposed in the bore 11 together with the selector key, which is disposed within the slot 12. The selector key 53 comprises two projections disposed at opposite ends respectively. These projections protrude from the slot 12. A selection mechanism may be provided to slide the selector key 53 within the slot 12 by operation through the bore 11.

Figure 2:
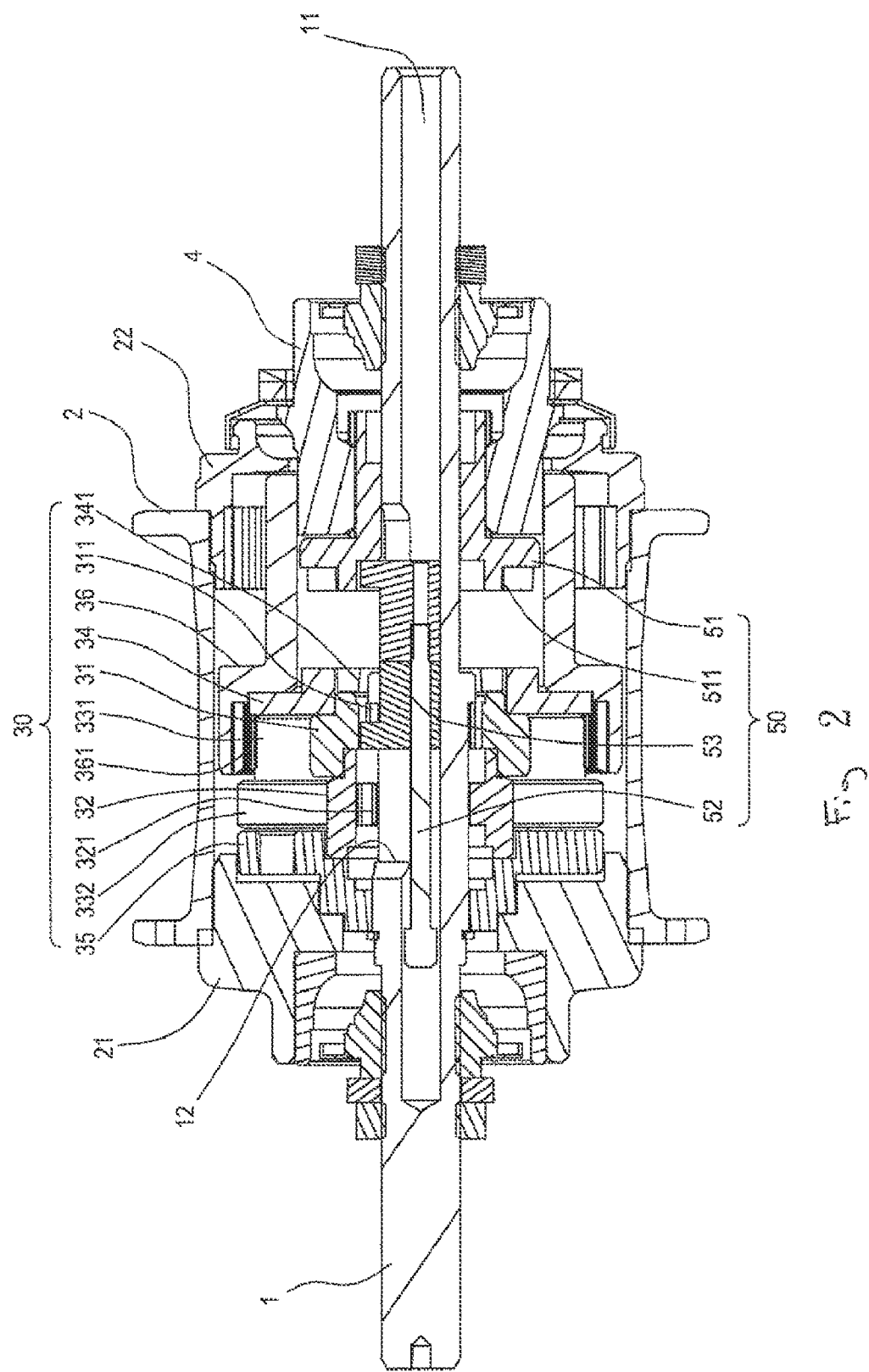
FIG. 2 is a longitudinal cross section of the gear hub of FIG. 1 in an assembled state with a first gear ratio selected.
Figure 3:
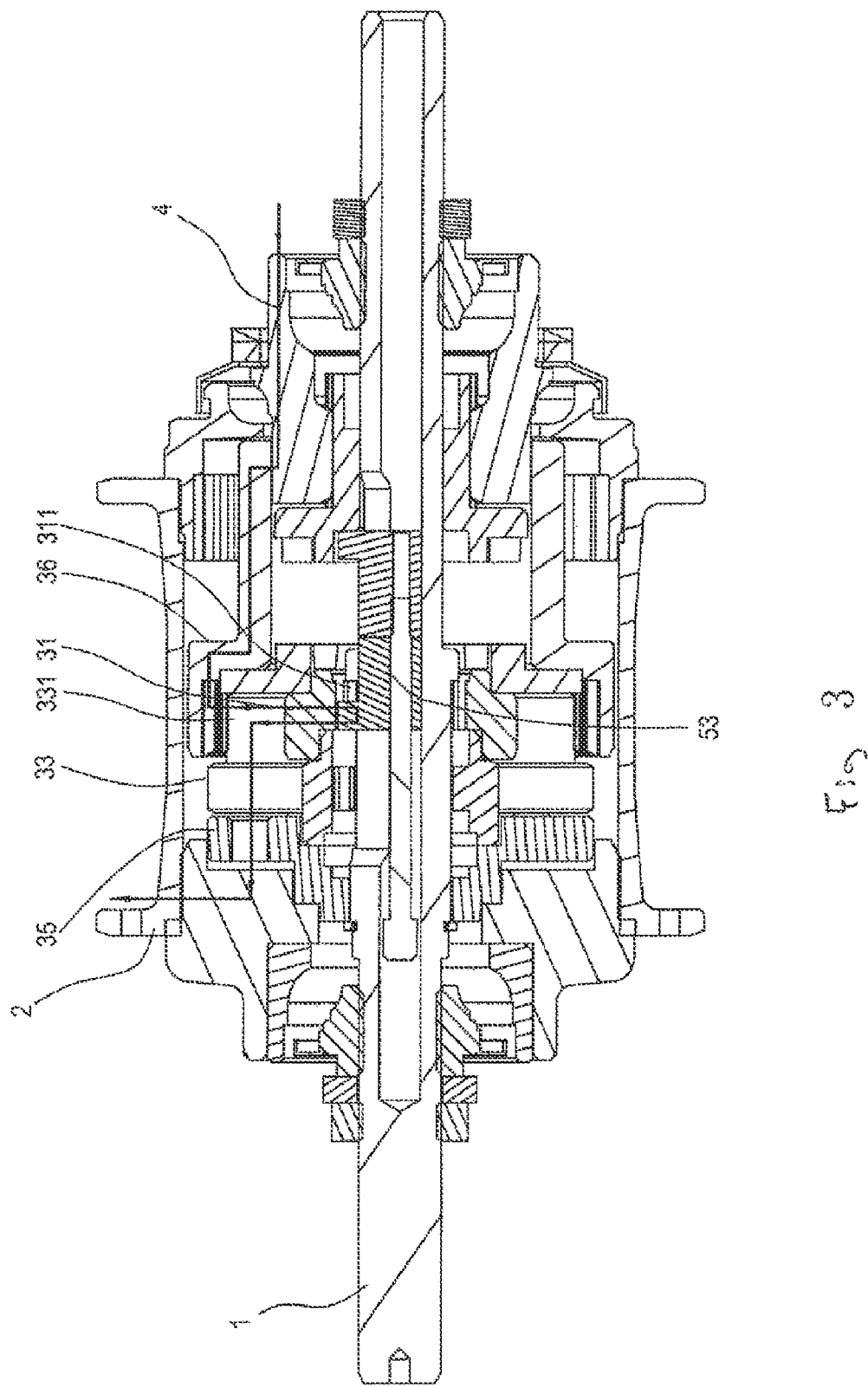
FIG. 3 corresponds to FIG. 2 with the addition of a line to show the transmission path through the gear hub.
Figure 5:
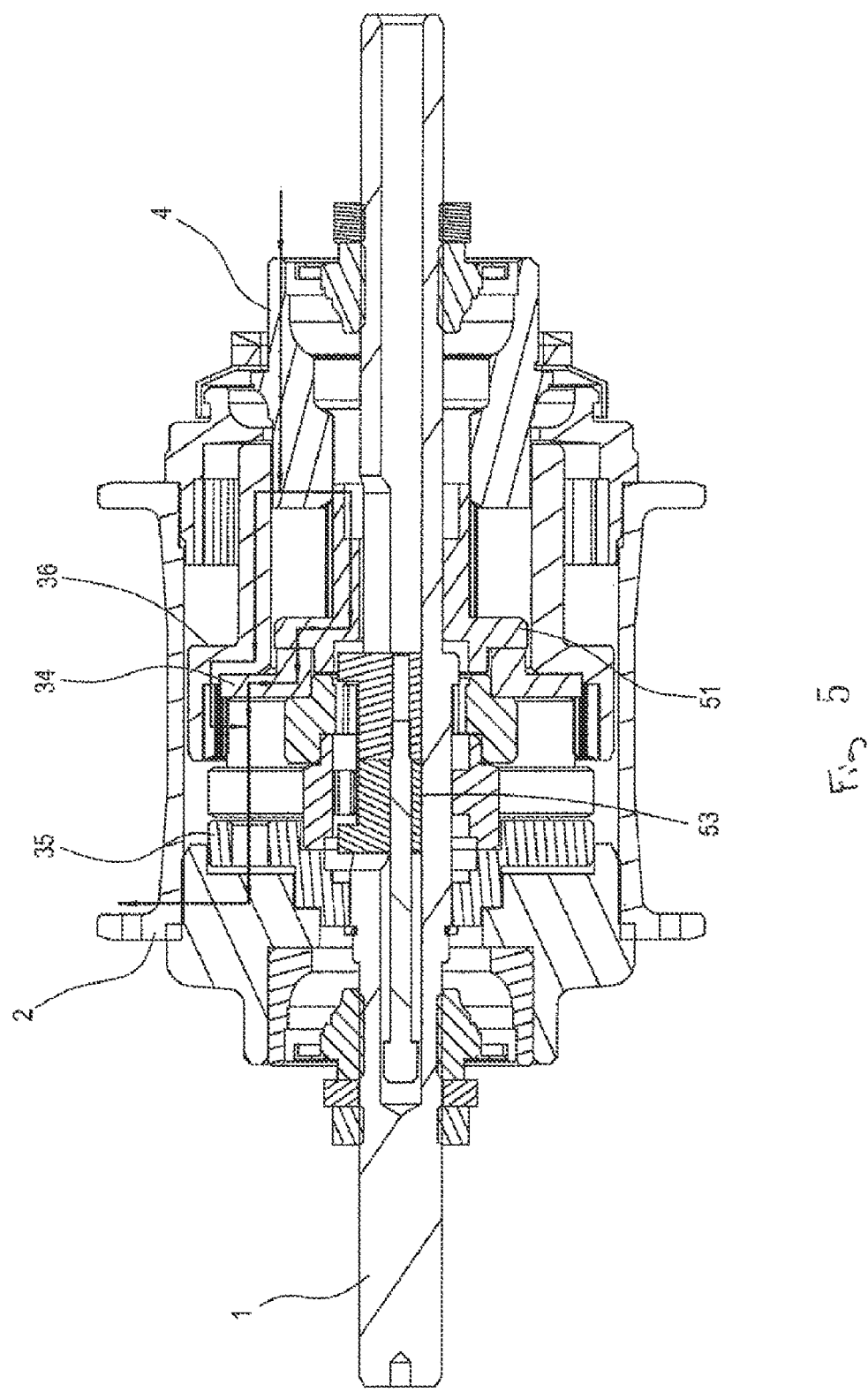
FIG. 5 is a longitudinal cross sectional view of the gear hub of FIG. 1 with a third ratio selected and a line showing the transmission path through the gear hub.

The selector key 53 may be moved within the slot 12 between far right hand (as shown in FIGS. 2 and 3) and far left hand (as shown in FIG. 5) positions. The right hand (as illustrated) protrusion of the selector key engages with the sliding dog clutch 51 and so movement of the selector key 53 causes movement of the clutch 51 axially relative to the axle 1 and input member 4. The protrusion may either engage in a slot in the clutch 51 so that the selector key can move the clutch in opposite directions along the axle, or the clutch may be resiliently biased against the selector key so that the selector key can urge the clutch in one direction against the resilient bias and the clutch will return in the opposite direction when the selector key is released. The left hand protrusion of the selector key is positioned to selectively engage with the internal splines 311, 321 of the sun gears 31, 32. In the far right position of the selector key the left hand protrusion engages with the first sun gear 31, locking the sun gear rotationally relative to the axle 1. As the selector key moves towards the left most position it engages with the internal splines of the second sun gear 32, locking the second sun gear rotatably relative to the axle 1 whilst allowing the first sun gear 31 to rotate relative to the axle 31. In its left most position, the left hand protrusion of the selector 53 moves beyond both sun gears 31, 32 allowing both sun gears to rotate relative to the axle 1. When in this position, the dog clutch 51 engages with the right hand part 34 of the planet cage.

The hub gear provides for three gear ratios. A first (lowest) ratio is provided when the selector key is in its right hand most position, as illustrated in FIGS. 2 and 3. In this position the first sun gear 31 is locked relative to the axle 1. When the input member 4 is rotated relative to the axle 1 it rotates the ring gear 36 to which it is fixed. The ring gear is meshed with and therefore rotates the compound planet pinions 33. As a result of the first sun gear 31 being locked rotationally relative to the axle 1 drive will be transmitted via the part of the planet pinions meshing with that sun gear to the left hand 35 part of the planet cage, causing rotation of the planet cage relative to the axle 1 and hence rotation of the ball cup 21 and hub shell 2.

Figure 4:
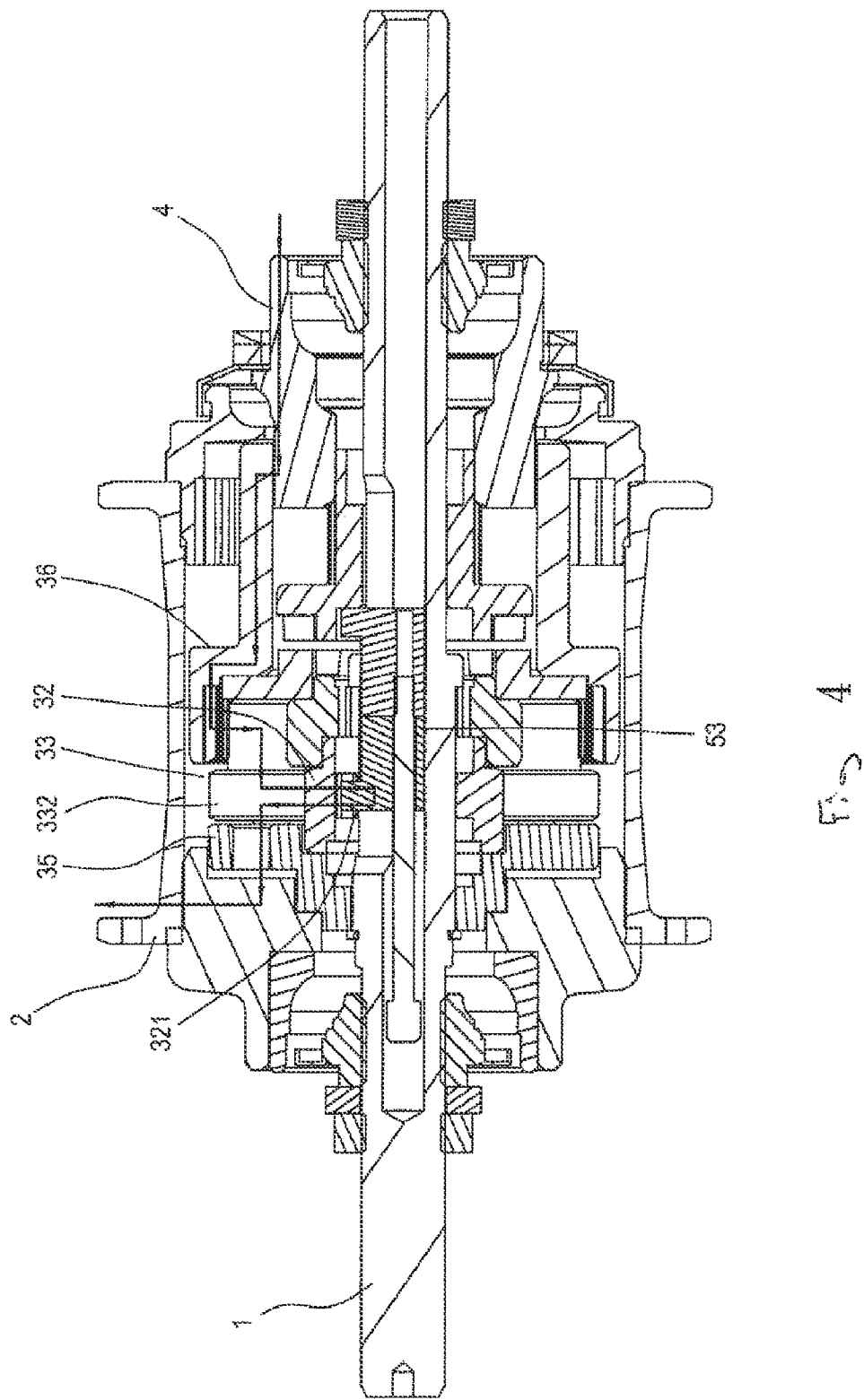
FIG. 4 is a longitudinal cross section of the gear hub of FIG. 1 with a second gear ratio selected and a line showing the transmission path through the gear hub.

The second and next highest gear ratio is obtained as the selector key 53 is moved to an intermediate position, illustrated in FIG. 4, in which the second sun gear 32 is rotationally locked relative to the axle 1. In this arrangement, drive is transmitted in a similar manner to that described above, save that it is transmitted via the part of the compound planet pinions 33 which meshes with the second sun gear, thereby providing a higher gear ratio.

A third gear ratio is obtained when the selector key 53 is moved to its left most position as illustrated in FIG. 5. In this position, the dog clutch 51 engages with the right hand side of the planet cage 34 providing a direct drive from the drive member 4 to hub shell 2. Both sun gears 31, 32 rotate relative to the axle 1.

All three gear ratios are obtained without the need for any one way rotational couplings or free-wheel arrangements. That is to say, all three ratios provide a fixed gear drive in which forward or backward rotation of the drive member 4 causes forward or backward rotation respectively of the hub shell 2, and vice versa.

The above embodiment is described by way of example only. Variations are possible without departing from the invention as defined by the appended claims. In particular, a two ratio embodiment is possible where a single sun gear is provided, which may be selectively locked relative to the axle 1.

Also, it should be appreciated that the gear ring may be indirectly connected to the input member via the clutch or that the clutch may be indirectly connected to the input member via the gear ring.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fixed gear internal gear hub comprising:
a fixed axle,
an input member and
an output member, each rotatably mounted about the axle,
an epicyclic gear system comprising at least one sun gear rotatably mounted about the axle and arranged to provide a fixed gear drive in which forward rotation of the input member causes rotation of the output member in one direction and backward rotation of the input member causes rotation of the output member in the opposite direction, planet pinions disposed in a planet cage and a gear ring, the gear ring being connected non-rotatably to the input member and the planet cage being connected non-rotatably to the output member,
a clutch for selectively non-rotatably connecting the input member to the planet cage and
a selector key for selectively locking the sun gear rotatably relative to the axle.

2. A fixed gear internal gear hub as claimed in claim 1 wherein the output member is a hub shell rotatably mounted on the axle.

3. A fixed gear internal gear hub as claimed in claim 2 wherein the input member is rotatably mounted between the hub shell and the axle.

4. A fixed gear internal gear hub as claimed in claim 3, in which the hub shell is mounted to the axle via a ball cup at one end and via a ball ring at the opposite end.

5. A fixed gear internal gear hub as claimed in claim 1 wherein the clutch is axially moveable along the axle relative to the input member.

6. A fixed gear internal gear hub as claimed in claim 5 wherein the clutch is connected to the input member by splines.

7. A fixed gear internal gear hub as claimed in claim 1 wherein the selector key is axially moveable along the axle relative to the sun gear.

8. A fixed gear internal gear hub as claimed in claim 7 wherein the clutch and selector key move together axially.

9. A fixed gear internal gear hub as claimed in claim 1 in which the axle includes a slot and the selector key is slidably mounted within the slot.

10. A fixed gear internal gear hub as claimed claim 1 comprising a connecting rod connected to the selector key.

11. A fixed gear internal gear hub as claimed in claim 1 in which the sun gear includes formations for engaging with the selector key.

12. A fixed gear internal gear hub as claimed in claim 1 wherein the epicyclic gear system comprises two sun gears and compound planet pinions.

13. A fixed gear internal gear hub as claimed in claim 1 in which the planet cage includes formations for engaging with the clutch.

14. A fixed gear internal gear hub as claimed in claim 1 wherein the clutch is a dog clutch.

15. A fixed gear internal gear hub as claimed in claim 1 wherein the input member is connected to the gear ring by splines.

16. A fixed gear internal gear hub as claimed in claim 1 wherein the gear ring is non-rotatably connected to the input member via the clutch.

17. A fixed gear internal gear hub as claimed in claim 1 wherein the clutch is non-rotatably connected to the input member via the gear ring.

\* \* \* \* \*